United States Patent
Gupta et al.

(10) Patent No.: US 8,260,938 B2
(45) Date of Patent: Sep. 4, 2012

(54) PREDICTING USER REQUESTS TO REDUCE NETWORK CONNECTION LATENCY

(75) Inventors: Apurv Gupta, Bangalore (IN); Arvind Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 12/359,038

(22) Filed: Jan. 23, 2009

(65) Prior Publication Data

US 2010/0191856 A1    Jul. 29, 2010

(51) Int. Cl.
   *G06F 13/00* (2006.01)
(52) U.S. Cl. ........................................ 709/228
(58) Field of Classification Search .................. 709/228; 715/205, 234, 261, 780, 816
   See application file for complete search history.

(56) References Cited

U.S. PATENT DOCUMENTS

| | | | |
|---|---|---|---|
| 6,332,158 B1 * | 12/2001 | Risley et al. | 709/219 |
| 7,487,145 B1 * | 2/2009 | Gibbs et al. | 1/1 |
| 7,499,940 B1 | 3/2009 | Gibbs | |
| 2002/0188757 A1 | 12/2002 | Yoon | |
| 2003/0009592 A1 | 1/2003 | Stahura | |
| 2003/0055979 A1 | 3/2003 | Cooley | |
| 2004/0143564 A1 * | 7/2004 | Gross et al. | 707/1 |
| 2004/0246228 A1 | 12/2004 | Nurmi | |
| 2007/0011168 A1 * | 1/2007 | Keohane et al. | 707/10 |
| 2007/0088681 A1 * | 4/2007 | Aravamudan et al. | 707/3 |
| 2008/0016233 A1 | 1/2008 | Schneider | |

OTHER PUBLICATIONS

International Search Report and Written Opinion of the International Searching Authority issued in international application No. PCT/US2010/021828, Sep. 7, 2010, 9 pages.
International Preliminary Report on Patentability issued in international application No. PCT/US2010/021828, Jul. 26, 2011, 6 pages.

* cited by examiner

*Primary Examiner* — Robert B Harrell
(74) *Attorney, Agent, or Firm* — Fish & Richardson P.C.

(57) ABSTRACT

Methods, systems, and apparatus, including medium-encoded computer program products, for decreasing latency perceived by a user in retrieving data from a data server. A user-initiated interaction with a user interface can be detected and a user-generated request to retrieve data automatically predicted, based at least in part on the user-initiated interaction. Resolution of a domain name into a network address can be initiated, based on the predicted user-generated request to retrieve data, prior to receiving a user-initiated submission of the user-generated request to retrieve data. In certain instances, a network communication synchronization sequence with a data server associated with the predicted user-generated request to retrieve data can be initiated prior to receiving a user-initiated submission of the user-generated request to retrieve data.

26 Claims, 11 Drawing Sheets

400a

| | 405 | 410 Frequency | 415 "w" | 420 "ww" | 425 "www.a" | 430 "www.am" | 435 "www.amaz" |
|---|---|---|---|---|---|---|---|
| www.cnn.com | | 10% | 14% | 14% | 0% | 0% | 0% |
| www.ebay.com | | 12% | 17% | 17% | 0% | 0% | 0% |
| mail.example.net | | 30% | 0% | 0% | 0% | 0% | 0% |
| www.amazon.com | | 25% | 36% | 36% | 83% | 93% | 100% |
| www.yahoo.com | | 10% | 14% | 14% | 0% | 0% | 0% |
| www.amamotocross.com | | 3% | 3% | 3% | 7% | 7% | 0% |
| www.macys.com | | 8% | 11% | 11% | 0% | 0% | 0% |
| www.apple.com | | 2% | 4% | 4% | 10% | 0% | 0% |

| | Frequency | "m" | "mai" |
|---|---|---|---|
| www.cnn.com | 10% | 0% | 0% |
| www.ebay.com | 12% | 0% | 0% |
| mail.example.net | 30% | 79% | 100% |
| www.amazon.com | 25% | 0% | 0% |
| www.yahoo.com | 10% | 0% | 0% |
| www.amamotocross.com | 3% | 21% | 0% |
| www.macys.com | 8% | 0% | 0% |
| www.apple.com | 2% | 0% | 0% |

FIG. 4B

PREDICTING USER REQUESTS TO REDUCE NETWORK CONNECTION LATENCY

TECHNICAL FIELD

This description relates to network communication technology, specifically decreasing network communication latency.

BACKGROUND

With the advent of broadband network communications, computer users have grown increasingly accustomed to requesting and quickly receiving data from other, sometimes remote, computers coupled to a network. In some instances, however, users can continue to experience lengthy communication latency between the time a request for data is submitted and initial data packets are received and presented to the user. Where latency is perceived to be high by the user, the user can attribute the delay to poor processor, software, or network performance, in spite of claims by software and internet service providers that the products and services they offer result in "fast downloads" and other performance benefits.

Some computer networks, such as the world wide web (or "internet"), employ protocols that require certain initialization steps to be performed between devices on the network before data can be transmitted between the devices. For example, the internet employs transmission control protocol (TCP) to facilitate transmission of data packets between end systems on the internet A three-way TCP handshake can be required to initiate and synchronize communication between end systems seeking to transmit data over the internet. The three-way handshake can begin with the transmission of a synchronization (SYN) packet from a client end system to a server end system. Upon receiving the SYN packet, the server can respond to the client with a synchronization acknowledgment packet (SYN-ACK), notifying the client that the SYN packet has been received and accepted. After receiving the SYN-ACK packet, the client completes the three-way handshake by transmitting an acknowledgement packet (ACK) to the server before finally sending packets requesting data from the server. Considering that SYN, SYN-ACK, and ACK packets can be quite small, particularly in comparison to packets of content data transmitted between client and server, completion of a three-way handshake can often be quite quick. However, in other instances, a TCP handshake can add up to two or more seconds to the overall communication latency, for example, when SYN or SYN-ACK packets are dropped and need to be re-sent, where multiple hops are required to transmit packets between end systems (for example, in remote or underdeveloped locations), or where network traffic is high between the client and server.

Some decentralized networks, including the internet, decentralize management of network addressing and domain name associations, for example, through the domain name service (DNS). The internet, in order to make addressing more intuitive and human-friendly, also employs (DNS) as well as uniform resource locators (URLs). Each computer on the internet can have a domain name associated with it. These domain names can be meaningful words or phrases, allowing human users to easily indicate a source or destination relating to a request for data, such as hypertext markup language (HTML) files capable of being rendered by a web browser into a webpage. Domain names, such as those employed in DNS, may need to first be resolved, or translated, into their actual network addresses, such as an IP address, in order for a computer to understand a request for data from and/or initiate communication with computers associated with the domain names. A limited number of centralized root servers are employed by DNS to catalog which domain names are associated with which IP address. Additionally, thousands of decentralized name servers can also be employed to manage subsets of domain name associations, thereby limiting the need for resolution requests to be forwarded to root servers for the millions of domain resolution calls made each day. Typically a name server will receive a request from a client computer to resolve a given domain name. Sometimes the first name server contacted will be able to resolve the domain, although in other instances the first name server will need to redirect the client computer to further name servers for resolution of the domain name, in some instances even leading to a query of a root name server. Accordingly, resolution of a domain name can be as quick as a few milliseconds to as long as two or more seconds. To decrease the number of DNS queries, as well as the latency associated with these queries, caching of recent domain name resolutions has emerged as a popular technique for limiting calls to name servers.

SUMMARY

Systems and methods can be implemented to decrease latency in retrieving data in response to a user's request by predicting the request and initiating domain name resolution procedures, communication handshaking, and/or other preliminary communication operations prior to receiving a submission of the request by the user.

In one general aspect, a user-initiated interaction with a user interface can be detected and a user-generated request to retrieve data automatically predicted, based at least in part on the user-initiated interaction. Resolution of a domain name into a network address can be initiated, based on the predicted user-generated request to retrieve data, prior to receiving a user-initiated submission of the user-generated request to retrieve data.

Implementations can include one or more of the following features. A domain name can be resolved by sending at least one domain resolution request to a remote server capable of resolving domain names into their respective IP addresses and receiving a response to the at least one domain resolution request identifying an IP address for the domain name. The user-initiated interaction can be a partial text entry in a field of a web browser. A partial text entry can be entered into an address field of the web browser. The user-initiated interaction can be a user command to display a first webpage comprising at least one hyperlink and the predicted user-generated request to retrieve data can be related to the at least one hyperlink. A user command can be a query directed to a search engine and the first webpage can display search results generated by the search engine in response to the query. The user-initiated interaction can be at least one of a text entry in a field of a search engine toolbar or an activation of a search engine toolbar. Automatic prediction of a user-generated request to retrieve data can be based at least in part on at least one of a stored user browsing history, stored user preference, stored cookie, or user profile data. A network communication synchronization sequence with a data server associated with the predicted user-generated request to retrieve data can be initiated prior to receiving a user-initiated submission of the user-generated request to retrieve data.

Implementations can also include one or more of the following features. A user-generated request to retrieve data can be automatically predicted by calculating a probability that a particular user-generated request will be submitted by a user and determining whether the probability meets or exceeds a threshold probability value. In some implementations, a user-generated request to retrieve data can be automatically predicted by calculating a first probability that a particular user-generated request will be submitted by a user, determining that the first probability meets or exceeds a first threshold probability value before initiating resolution of a domain name. An updated probability that the particular user-generated request will be submitted by the user can then be calculated. It can be determined that the updated probability meets or exceeds a second threshold probability value before initiating the network communication synchronization sequence.

In another general aspect, a user-initiated interaction with a user interface can be detected and a user-generated request to retrieve data automatically predicted, based at least in part on the user-initiated interaction. A network communication synchronization sequence with a data server associated with the predicted user-generated request to retrieve data can be initiated prior to receiving a user-initiated submission of the user-generated request to retrieve data.

Implementations can include one or more of the following features. The user-initiated interaction can be at least one of a text entry in a field of a search engine toolbar or an activation of a search engine toolbar. The network communication synchronization sequence can be a three-way handshake. A plurality of user-generated requests to retrieve data can be automatically predicted and network communication synchronization sequences can be initiated with a plurality of data servers. Automatic prediction of a user-generated request to retrieve data can be made by a first computer and transmitted to a second computer responsible for initiating the network communication synchronization sequence. An automatic prediction can be based in part on historical data compiled from a plurality of users having accessed the first computer.

In a general aspect, a system can predict a user request for data and initiate initialization steps based on the prediction. The system can include a plurality of remote data servers capable of being accessed by client computing devices over a network and at least one remote domain name server capable of receiving requests from client computing devices related to resolutions of domain names. A first client computing device can include a user interface. The first client computing device can be adapted to detect a user-initiated interaction with the user interface and automatically predict, based at least in part on the user-initiated interaction, a user-generated request to retrieve data. The first client computing device can be further adapted to initiate resolution of a domain name, based on the predicted user-generated request to retrieve data, into a network address prior to receiving a user-initiated submission of the user-generated request to retrieve data. The first client computing device can also be adapted to receive user-initiated submissions of requests to retrieve data from at least one of the plurality of remote data servers.

Implementations can include one or more of the following features. The first client computing device can be further adapted to initiate a network communication synchronization sequence with at least one of the plurality of remote data servers associated with the predicted user-generated request to retrieve data, prior to receiving the user-initiated submission of the user-generated request to retrieve data. The first client computing device can be adapted to store user profile data and automatically predict a user-generated request to retrieve data based at least in part on the stored user profile data. The system can also include at least one other client computing device. A particular one of the plurality of remote data servers can be adapted to record a history of client computing device requests for data and automatically predict subsequent client computing device requests for data based at least in part on the history. The particular one of the plurality of remote data servers can be further adapted to transmit recommendations to client computing devices relating to the automatically-predicted subsequent requests for data, the first client computing device further adapted to automatically predict a user-generated request to retrieve data based at least in part on a received recommendation from the particular remote data server. The particular remote data server can be a search engine server.

Implementations may include systems, methods, software products, and machine-readable media storing instructions for causing data processing apparatus to perform operations. The details of one or more implementations are set forth in the accompanying drawings and the description below. Other features will be apparent from the description and drawings, and from the claims.

DESCRIPTION OF DRAWINGS

FIG. 4A is a table illustrating a first calculation of probabilities that a request for data will be submitted relating to an example set of domains.

FIG. 4B is a table illustrating a second calculation of probabilities that a request for data will be submitted relating to an example set of domains.

Like reference symbols in the various drawings indicate like elements.

DETAILED DESCRIPTION

Obtaining data from a remote computing device on a network, such as the internet, can involve a number of preliminary communication initialization steps. For example, a client computing device may need to first resolve a domain name of the remote computing device before initiating communication with the remote device. Further, initiating communication may involve synchronizing or otherwise initializing communication between a client computing device and the server computing device, for example, through a TCP three-way handshake. In some instances, network address resolution, synchronization, or other initialization steps must be completed before a single packet of content data can be served to the client. As a result, the time required to complete, or at least begin, these preliminary communication steps can result in added communication latency experienced by users seeking access to data provided by other computers on the network.

While domain resolution caching and other existing remedies can marginally assist in reducing communication latency related to the execution of initialization steps, network users may be limited in the remedies available to them. In many instances, latency issues are tied to performance of network components or end systems on the other end of a network communication over which users have little control. There may be no way for a user to control the actual duration required for the execution of a given initialization step. However, user computers can execute instructions to cause initialization steps to begin earlier in the development of a data transaction, thereby decreasing communication latency experienced by the user. For instance, to decrease the latency perceived by a user, and thereby accelerate transmission of data to the user and improve the user's experience using the network, the user's computing device can be adapted to pre-initiate initialization steps relating to a data transaction over a network, such as domain name resolutions, by forecasting or otherwise predicting the nature of the data transaction. As a result, certain initialization steps can be initiated prior to the initiation of the actual data transaction itself.

Figure 1A:
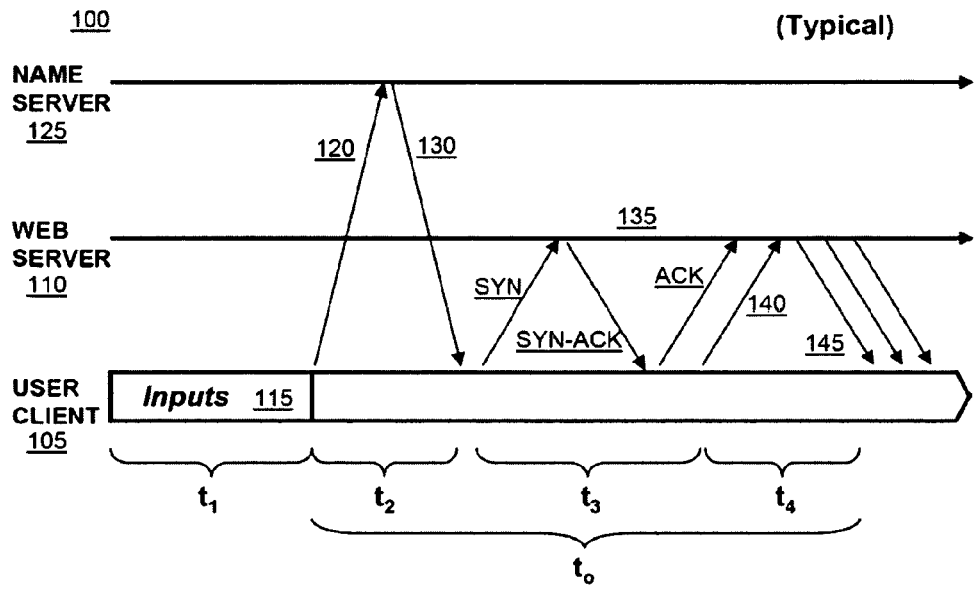
FIG. 1A is a signaling diagram of a first data transaction over a network.

FIG. 1A illustrates a communication signaling diagram 100 for an example data transaction involving a user computing device 105 and another computing device 110 accessible over a network, such as the internet. The computing device 105 may employ a web browser or other software application for receiving user requests to retrieve data from the network and displaying the retrieved results to the user. The user can provide inputs 115 to the computer to designate a network location related to a server computer 110 from which to retrieve data. For example, a user may designate a URL, network address, or domain name, such as www.example.com to retrieve a web page related to that domain. The process of receiving and processing the user input and request can constitute a duration $t_1$.

With the received user-generated network location request, the user computer 105 can initiate initialization steps for communicating with and retrieving requested data from the user-designated network location 110. For example, the user computer 105 may transmit a resolution request 120 to a domain name server 125 to resolve a domain name received from the user. Transmitting the resolution request 120 and receiving a resolution response 130, identifying a network address associated with the domain name, may require a time $t_2$. Having identified the network location relating to the user request for data, the user computer 105 can then initiate communications with the computing device 110 at the identified network location. As an example, the user computer 105 may synchronize or otherwise initialize communication with the server computer 110, for instance, through a three-way handshake 135, such as used in TCP, lasting a period $t_3$. In this example, the user computer 105 does not transmit a request 140 for the user-requested data to the server 110 until at least the SYN-ACK message portion of the handshake 135 is sent from the user computer 105 to the server 110. Accordingly, in this example, a user may not begin to see the requested data until the user computer receives the first packet 145 of what can be a plurality of data packets transmitted from the server 110 in response to the request for data 140. The time required to send data request 140 and receive the first packet 145 in response can require an additional time $t_4$. Accordingly, the total latency $t_o$ perceived by the user of the computing device 105, as the user awaits transmission of the requested data, can result from portions of periods $t_2$, $t_3$, and $t_4$.

Figure 1B:
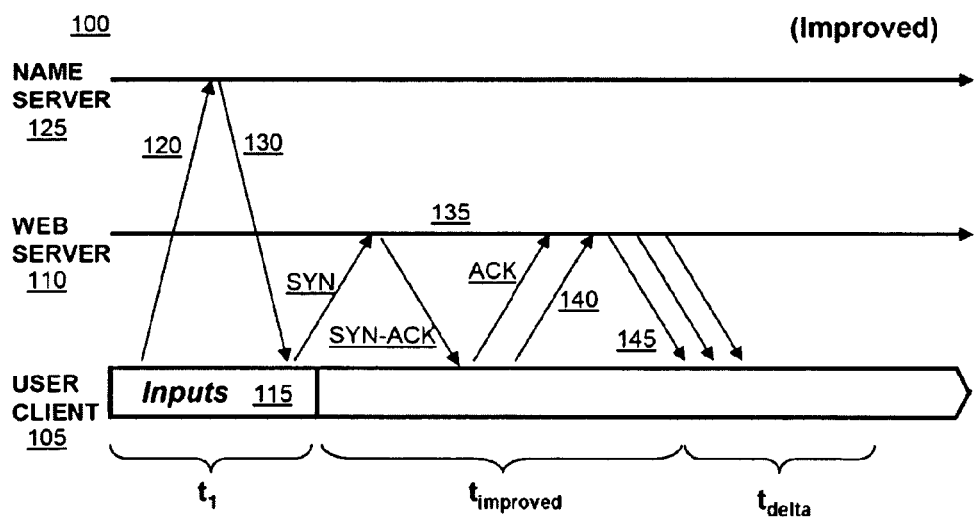
FIG. 1B is a signaling diagram of a second data transaction over a network employing pre-initiation of initialization steps.

The total latency, $t_o$, perceived by a user can be improved if certain initialization steps can be initiated prior to the receipt of a completed user request for data 115 at the conclusion of period $t_1$. As shown in the example of FIG. 1B, if the resolution step and/or the synchronization steps can be initiated or even completed prior to receiving the completed user request for data 140 at time $t_1$, perceived latency can be decreased $t_{improved}$, resulting in a perceived latency decrease of $t_{delta}$. Indeed, in some instances, perceived latency decrease $t_{delta}$ can be even greater than in the illustrated example, with all initialization steps (e.g., 120, 130, 135) initiated and completed prior to the receipt of a user request for data 140. Additionally, because many initialization steps require an accurate identification of at least the target computing device 110 that is to serve the requested data, performing initialization steps prior to receiving the actual user request may first require forecasting or predicting the target of the request. Predictions of the target, type, and content of a user request for data can be made based on user interactions with programs, modules, and other applications employed by the user's computer in accepting and processing requests for data from other devices on the network.

Figure 2A:
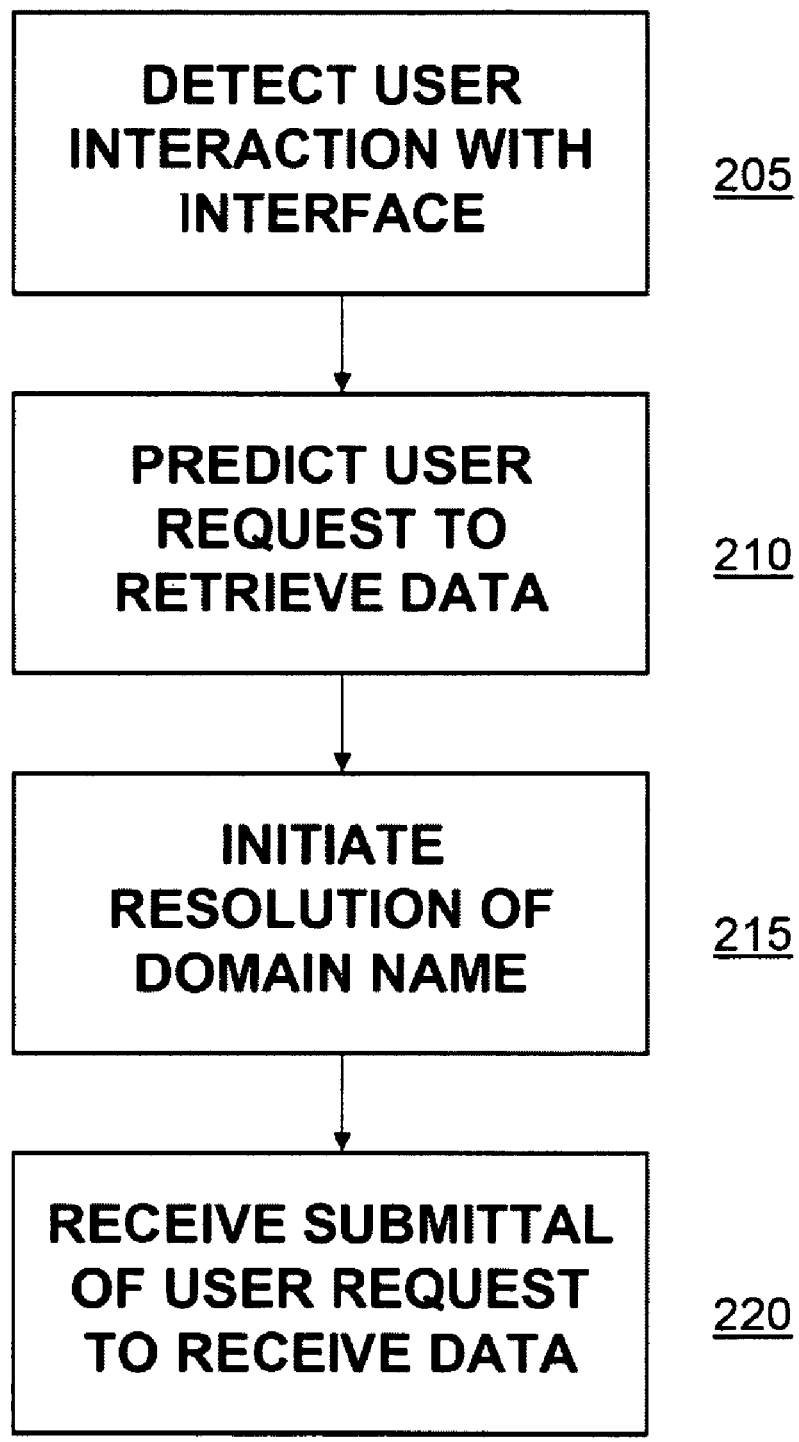
FIGS. 2A-2C are flow diagrams illustrating example techniques for pre-initiating initialization steps for reducing perceived communication latency.

FIG. 2A illustrates an example technique 200a for improving perceived communication latency in a network data transaction. A user-initiated interaction with a user interface of a computing device, or application run on or in connection with the computing device, can be detected at step 205. In some instances, the user-initiated interactions with the user interface can be the user's partial generation or submittal of a request to retrieve data. A user-initiated interaction can include character entries in a data field of an interface, for example, an address field of a web browser. In other instances, the movement of a cursor or arrow using a mouse, joystick, or keyboard can be a user interaction. User interactions can also include the selection of a hyperlink, button, or other control on the user interface, for example, by clicking a mouse button or pressing the return key of a keyboard. Using the user-initiated interaction, characteristics of a user-generated request to retrieve data can be automatically predicted, at step 210. In some instances, this prediction can be based upon prior user entries, browsing history, cookies, metadata, or profile data relating to the user. In other instances, aggregate history data compiled from a plurality of users' interactions with computing devices in a network can be used as the basis of an automatic prediction of a user request to retrieve data. At step 215, resolution of a domain name, related to the predicted user-generated request to retrieve data, can be initiated, for example by identifying and submitting a domain name query to a name. The domain name can be resolved into a network address by the name server and returned to the requesting computer. Initiation of the domain name resolution can occur prior to a user submitting the user-generated request to retrieve data at step 220. Initiating a domain resolution prior to submittal of the data request (or pre-initiating), can result in a decrease in perceived communication latency as well as hasten the retrieval of the requested data.

Figure 2B:
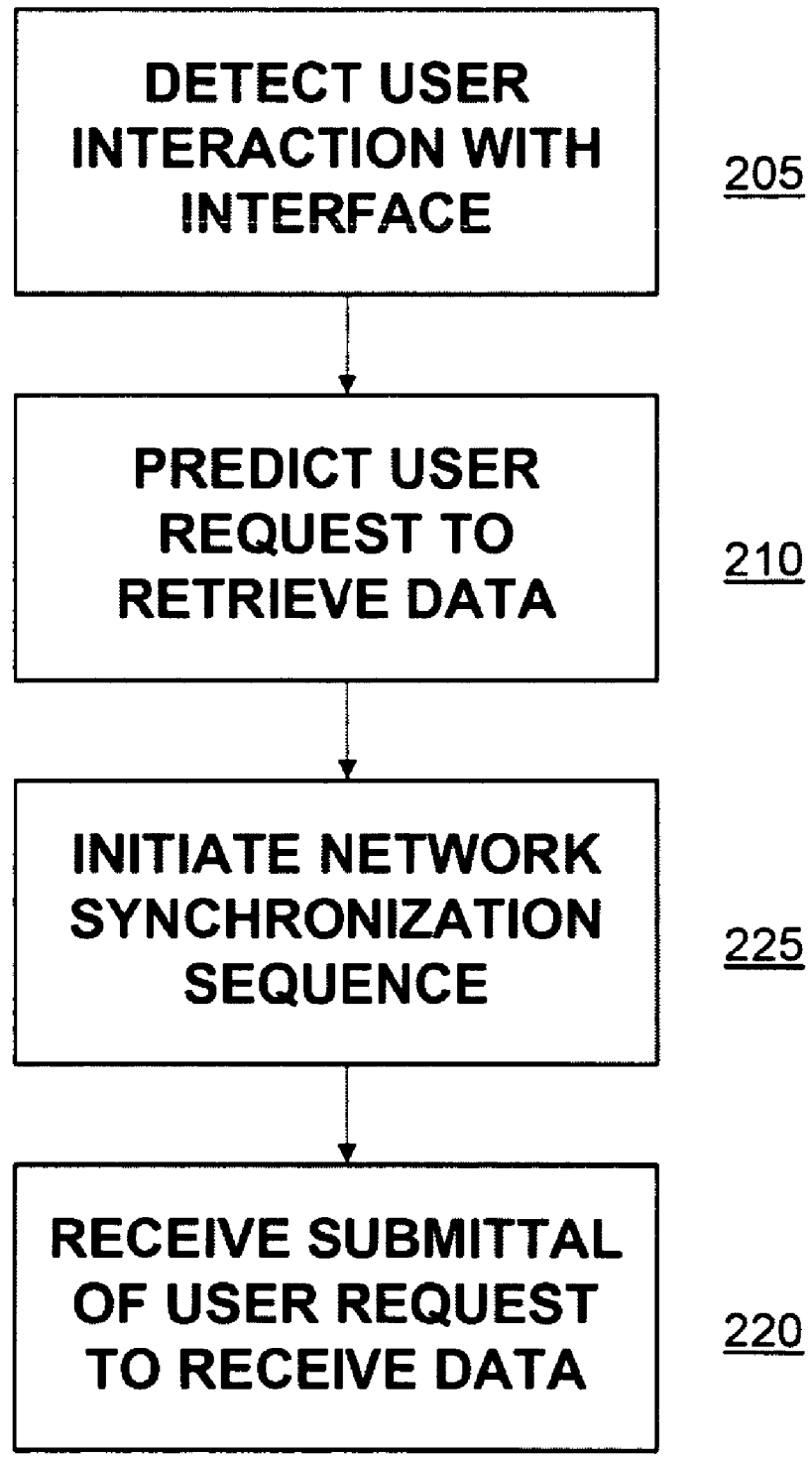

In another implementation, illustrated in the flow chart 200b of FIG. 2B, the initialization of a domain resolution (e.g., step 215 in FIG. 2A) can be replaced or supplemented with the initialization of a network communication synchronization sequence (step 225). Indeed, in some instances, it may not be necessary to resolve a domain name into a network address. For instance, a user can sometimes specify the network address directly, for example by specifying an IP address, in lieu of a domain name. A user input or selection of a network address can be a user-initiated interaction with a user interface of a computing device or application run in connection with the computing device. Initialization of the network communication synchronization 225 can be performed based on a predicted user-generated request, automatically predicted at step 210, the prediction based at least in part on detected user interactions with the user interface (at step 205). The network communication synchronization sequence can be directed to a data server associated with the predicted user-generated request to retrieve data, and initiated 225 prior to receiving a user-initiated submission of the user-generated request to retrieve data at step 220.

Figure 2C:
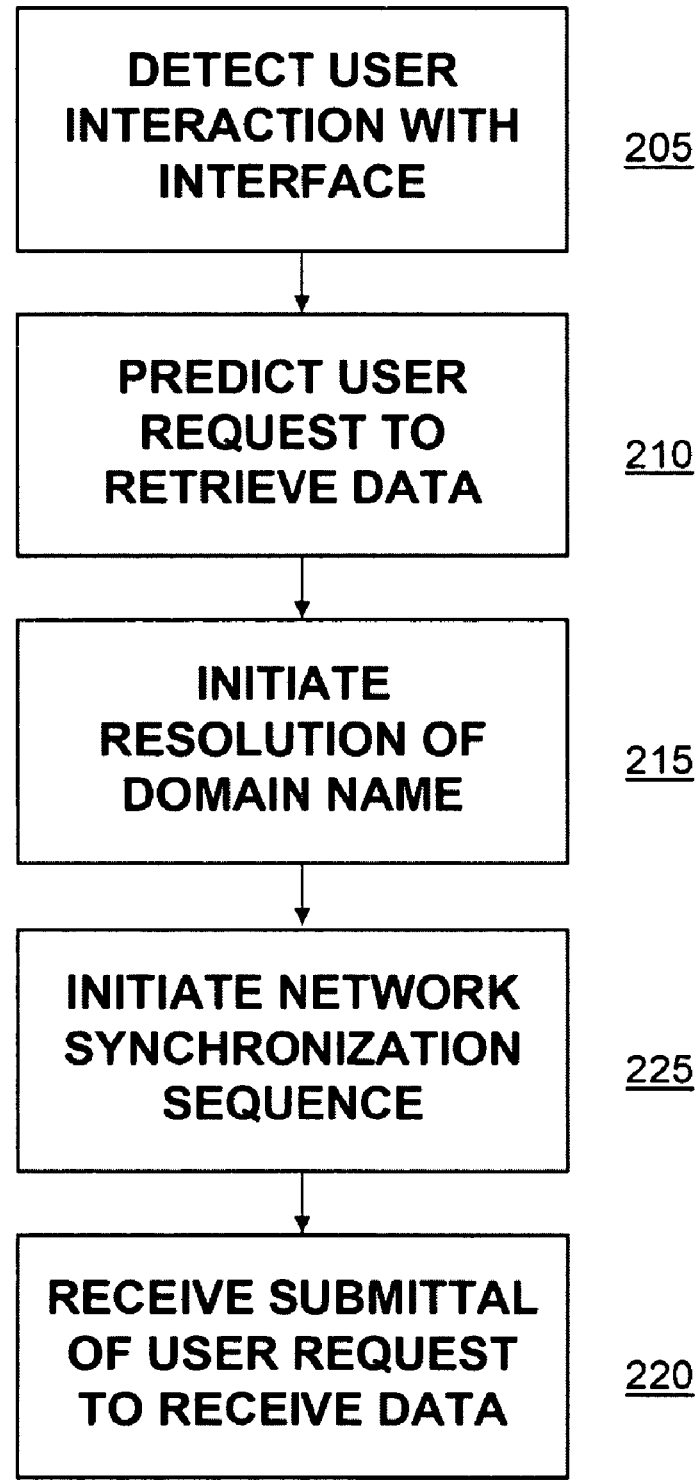

Additionally, as shown in the flowchart 200c of FIG. 2C, in some implementations a user interaction with the interface can be detected 205 and a user request to retrieve data predicted 210 allowing both a resolution request 215 and a network communication synchronization sequence 225 to be initiated, based on the predicted request. In some instances, it may be necessary for the resolution request to be initiated 215 and completed prior to the initialization of a synchronization sequence 225. Additionally, one or more of the domain name resolution or synchronization sequence 225 can be initiated prior to the user submittal, at step 220, of the user-generated request for data. In other implementations, additional or substitute initialization steps and processes can be initiated prior to a user's submission of a request for data, the initiation of the initialization steps based at least in part on the prediction of a user request for data. The initialization steps and processes that are pre-initiated based on a prediction of a user request for data can depend on the requirements, specifications, and protocols of the network and computing devices involved in the data transaction.

Figure 3:
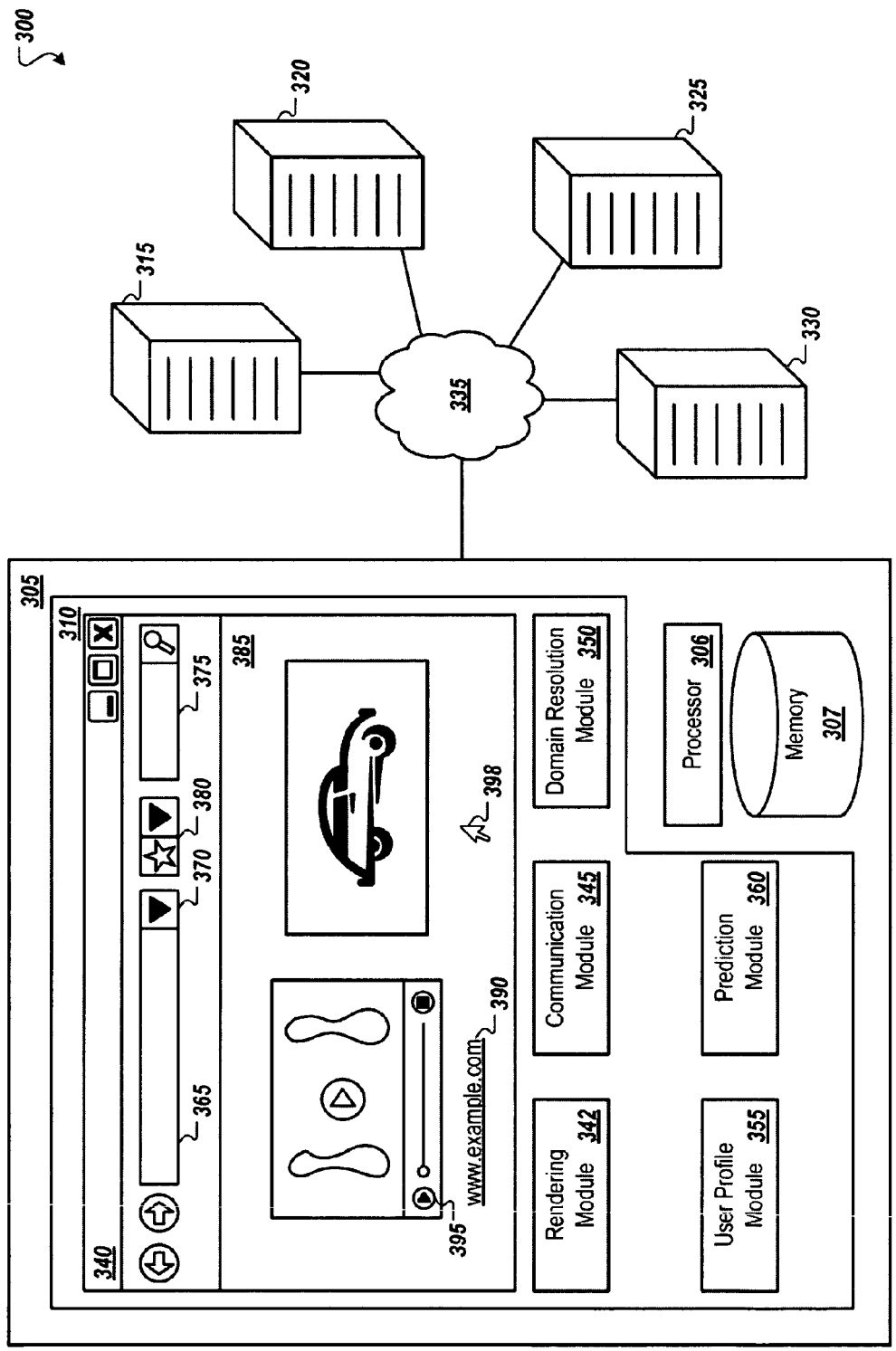
FIG. 3 is a schematic diagram of an example system for pre-initiating initialization steps for reducing perceived communication latency.

FIG. 3 illustrates an example system 300 capable of predicting a user request for data from the network and pre-initializing communications with one or more computing devices on the network. The system 300 may be capable of performing some or all of the steps and techniques described above in connection with FIGS. 2A-2C. The system 300 can include a client computing device 305 having a processor 306 and machine readable storage 307. The client computer 305 can run or otherwise access a browser or similar application 310 for managing requests for data from other computing devices 315, 320, 325, 330 communicatively coupled to a network 335. The browser 310 can include a graphical user interface 340 and other modules including a rendering module 342, communication module 345, domain resolution module 350, user profile module 355, and prediction module 360. In some implementations, modules 342-360 and functionality used in predicting and pre-initializing user requests for data can be combined with other modules or provided by other applications, including applications external to the computing device 305.

A user interface 340 can provide for one or more user interactions to be accepted, directed to requesting or displaying data from other computing devices accessible through the network 335. For example, a user may enter characters in an address field 365 to specify a domain name, IP address, or other network address associated with a computing device or directory from which to retrieve data. Upon entering the desired textual identification of a source for data, the user may submit the request by, for example, hitting a return key or selecting a submit button 370 on the interface 340. Other browser interface controls can also be accessed and interacted with by the user to request data or navigate to other files. For example, a search toolbar 375 can be provided, allowing for search queries to be entered and submitted for processing by one or more search engines. Additionally, favorite network locations, recently-viewed pages or files, bookmarks, or other lists or shortcuts can be accessed by a user on the interface 340. For example, clicking an icon 380, may result in the display of a user's personal bookmarked web pages, allowing the user to request web page data relating to a bookmarked site by clicking on a displayed name of the bookmarked page. Bookmarks, user preferences, cookies, metadata, browsing history, and other data can be stored and managed using a user profile module 355.

In addition to browser navigation, search, history, and bookmark controls, a presentation screen 385 can be provided to present to the user retrieved data, such as web pages, documents, spreadsheets, and other files. Some implementations may also allow for audio, video, and other multi-media files and data to be presented using the presentation area 385. The rendering module 342 can build and translate data received by the computing device 305 to present to the user. Virtual machines, media players, and other tools used for rendering or presenting content, including specialized data, can also be managed by or incorporated in the rendering module 342. Data presented to the user in the presentation area 385 of the user interface 340 can be further manipulated and interacted with by the user. For example, a user may select a hyperlink 390 or other control, such as a button 395 on a java tool or other virtual machine implemented in content presented in the presentation area 385. A user can interact with content by clicking on controls or even moving a cursor 398, for example, with a computer mouse. Movement of a cursor 398 within the interface 340 can be interpreted by the browser 310 to be a command or interaction unto itself, resulting in the movement of a cursor 398 on the interface 340, manipulation of a graphical object or avatar, or other command within the browser 310 or content rendered and/or displayed by the browser 310.

User interactions with the browser utilities or content presented or rendered by the browser 310 can be used by a prediction module 360 to predict the intention of the user to ultimately submit a request for data to another computing device on the network 335. The prediction module 360 may use information managed by the user profile module 355 to assist in making the prediction. For example, in some instances, the user profile module 355 may store a history of files or websites requested by a given user. A prediction module 360 may be able to make more accurate predictions by consulting a user's browsing history and determining the likelihood that a user's inputs or other interactions indicate the user's intention to eventually request data from a given computing device 315, 320, 325, 330 on the network 335. A prediction module 360 can also utilize other data, managed by the user profile module 355 or some other module or computing device, to develop predictions based on, for example, user favorites or bookmarks, prior requests or tendencies of other users and user computing devices, trends or patterns relating to a particular sequence of preceding user requests, the time and/or location of the present request, or other information capable of being used to calculate the statistical probability that the user will submit a particular request for data. Upon making a prediction, the prediction module 360 may signal other modules capable of performing certain initialization steps in response to the prediction, such as a resolution module 350 or communication module 345. For example, the prediction module 360 may predict from a user input of "www.ex" that a user wishes to retrieve a website from www.example.com. In response to this prediction, a domain resolution module may send, for example, a DNS resolution request for processing and resolution by domain name servers (e.g., servers 325, 330). Upon receiving a resolution of www.example.com into its associated IP address, a TCP handshake or other synchronization sequence may be initiated by the communication module 345. In some instances initiation and even completion of the domain name resolution and/or the synchronization handshake can take place before the user completes the entry "www.example.com" and presses Enter, thereby decreasing latency experienced by the user.

The risk inherent in sending a pre-initiated transmission, such as when a domain resolution request is initiated and sent prior to an explicit request for data from the domain, is that the transmission will be incorrect, resulting in the unnecessary use of network bandwidth and processor capacity. In one implementation, a prediction module 360 or software application can require that a forecast of a certain user request attain a pre-determined degree of certainty before being relied on to initiate initialization steps prior to actual submittal of the user request. FIG. 4 shows a table 400a illustrating an example user history. Column 405 shows a listing of websites recently accessed by a user or a browser on a user computer. The listing 405 can be all sites recently accessed, for example within the last month or some other period, or just those sites accessed most frequently. In some instances, a history of all domains and sub-domains may be tracked in the user history 400a, weighting more heavily, visits to sites most recently accessed. Column 410 depicts the likelihood a given domain in the listing 405 will be selected by a user at any given time. However, as a user interacts with an interface of the browser, for example, by typing in a URL for a website, the likelihood that the user will select a given domain changes and can be recalculated. For example, as shown in columns 415-435, as more inputs or interactions are detected or received from a user, the probability that the user will select a domain can converge. Probabilities calculated based on a user history or other data, may be achieved, for example, through the use of a prefix trie algorithm, or other algorithm employing associative data arrays.

As illustrated in FIG. 4A, some user interactions may do little to increase the likelihood that one request for data will be made over another. For instance, where a user is inputting characters specifying a domain name related to a request for data from a web server on the internet, the entering of characters "w", and even "ww" do little to narrow the set of domain names the user is likely to enter (as shown in columns 415, 420). However, in this particular example, an algorithm is employed that results in the exclusion of at least the domain "mail.example.com" once a "w" is input by the user, considering that the domain does not begin with or contain the letter w. Other implementations may employ different algorithms that would not result in the absolute exclusion of the mail.example.com domain however, based on a user entry of "w" or "ww". For example, an algorithm may be employed that accounts for user error, such as mistypes by the user, eventual deletions and re-types, or shortcut names or aliases associated with a domain that may be entered. In such instances, the probability that a user may select mail.example.com may not be zero despite the user having entered "w" or "ww", the non-zero probability factoring into predictions made by the computer. Additionally, considering that many internet domain names begin with the "www" prefix, some algorithms may treat the entry of a "w" differently, or even ignore it when entered as "www", for example as illustrated in an alternative user history table 400b in FIG. 4B. Other algorithms can also be applied, using similar or different principles, for user interactions not involving the entering of text, for example, cursor manipulations, voice commands, and mouse clicks.

In some instances, a prediction may not be made or acted upon until it has been determined that a request or subset of possible requests is sufficiently likely. In one example, a prediction can be acted upon to initiate initialization steps, such as a domain resolution request, only when the probability of the prediction's accuracy exceeds a certain threshold. For example, an algorithm may require that no prediction be made and acted upon until one data request can be identified that is more than 90% likely to be made by the user. In the example of FIG. 4A, this threshold is reached once the user enters the characters "www.am" 435. Here, the user computer determines that the user is 93% likely to select data belonging to a domain "amazon.com", meeting and exceeding the preset 90% accuracy threshold.

In another example, a prediction can be made when the universe of likely or possible requests is reduced to a predetermined number. For example, a prediction algorithm may dictate that a prediction can be acted upon once the universe of likely requests is reduced to three or less. In such a case, the user computer may then simultaneously pre-initiate initialization steps for each of the three or fewer predicted requests. Returning to the table 400a of FIG. 4A, in one example, a user enters the characters "www.a" 425. While this entry would not have satisfied an algorithm requiring a single site passing a certainty threshold of 90%, in this example, the entry "www.a" reduces the number of possible entries to three: "www.amazon.com", "www.amamotocross.com", and "www.apple.com". Such an algorithm increases the probability that initialization steps will be carried out for the user's actual, eventual data request, while allowing an accurate prediction to be made earlier, after fewer user interactions have been detected. On the other hand, predictions returning more than one possible data request result in greater use of computing and network resources as initialization steps are to be carried out, potentially unnecessarily, for each of the plurality of predicted requests. Other prediction algorithms and thresholds may be implemented or combined to meet the needs and characteristics of the network, indeed a single computer or browser application may utilize a plurality of algorithms to achieve the desired level of performance and accuracy. For example, different certainty thresholds, or methods for determining a certainty percentage, can be specifically implemented for or tailored to each type of detected user interaction.

Returning to FIG. 3, a number of user interactions with interface 340 can provide the basis for a prediction and pre-initialization sequence. As detailed in connection with FIGS. 4A and 4B, user inputs in an address field 365 can be used to predict a request for data from a domain associated with the user inputs. Similarly, in other examples, user entries in a search toolbar field 375 can be used to predict requests for data made to one or more search engine servers. For example, a search toolbar 375 may be associated with a search engine, such as Google, Yahoo, Baidu, or Ask.com. When a user clicks on the search toolbar field to enter a search query, this or another interaction with the search toolbar field 375, such as the entry of text in the field 375, may be determined sufficient to predict that the user intends to request data from a server associated with the search engine. The user computer can then initiate initialization steps, such as a domain resolution for a search engine server or a synchronization handshake between the computer and the search engine server, in advance of the user entering and submitting a search query in the search toolbar field 375 to be sent to the search engine server. In other examples, a single search toolbar 375 may allow a user to submit search queries to multiple, different search engines. Activation of or entries made in the search toolbar field 375 may result in the initiation of initialization steps for a favorite one or all of the multiple search engines, the user computer automatically predicting that the user intends to submit a search query to one or more of the multiple search engines affiliated or accessible with the search engine toolbar 375.

In some instances, a user need not activate, click, or enter inputs into a field or control of the interface 340, such as the search toolbar field 375 or a hyperlink 390, in order to trigger a prediction and initialization steps related to a predicted user request for data. For example, the user computer may detect movement or acceleration of a cursor, such as a selection arrow 398 manipulated by a mouse, toward or near a field, hyperlink 390, or other control capable of resulting in a user request to retrieve data from another computer on the network. For instance, movement of a cursor within a certain range near or hovering over the search engine toolbar 375 may be determined to be sufficiently indicative of a user's intention to submit a request for data relating to the search engine toolbar 375. As a result of the cursor's 398 position or movement near the search engine toolbar 375, certain initialization steps may be initiated relating to servers affiliated with the toolbar 375, even before the user has clicked on or entered text in the toolbar field 375. Similar predictions can also be made as users move cursors near hyperlinks 390, buttons (e.g., virtual machine control 395), and other controls or content presented on the interface 340.

Figure 5A:
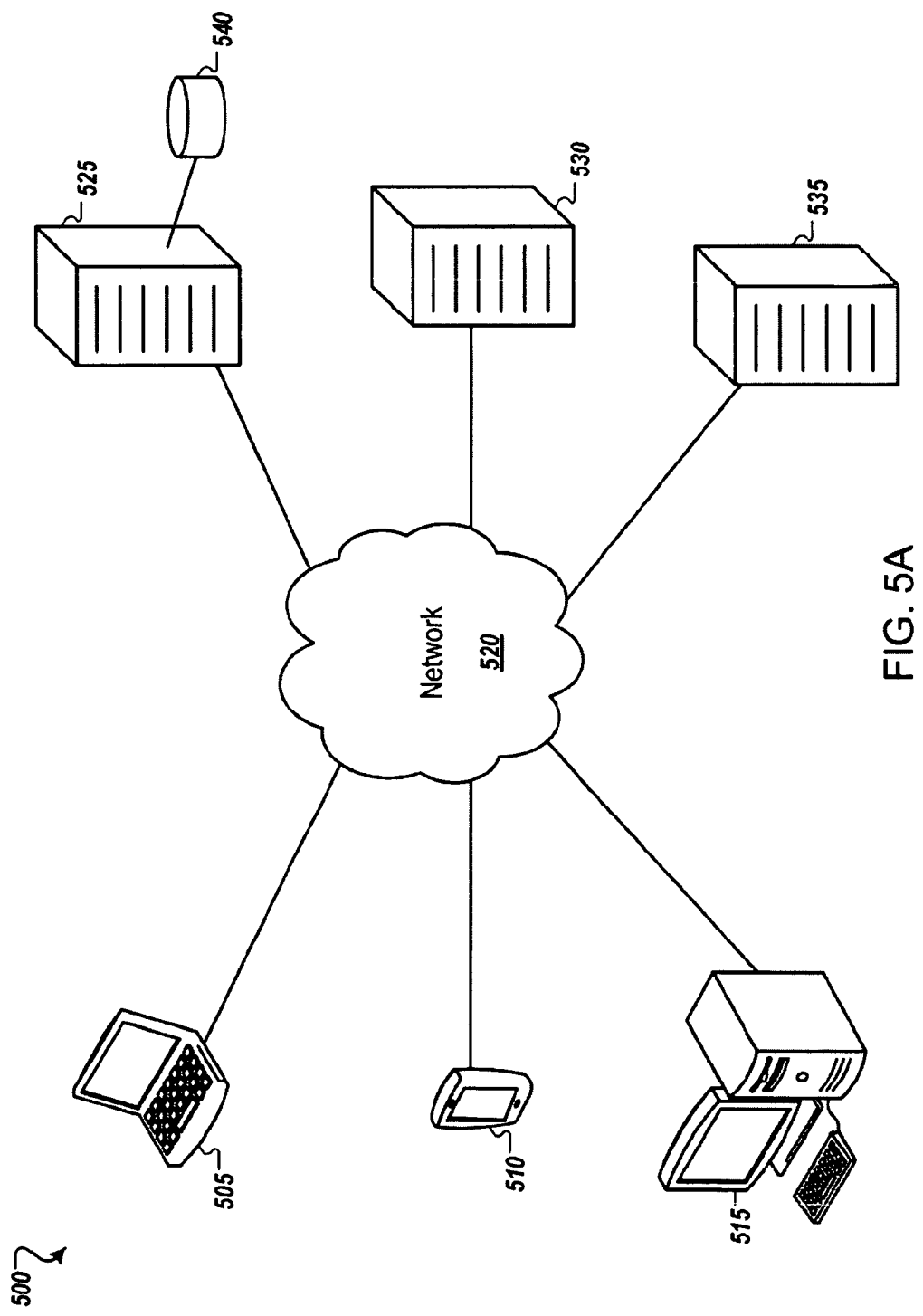
FIG. 5A is a schematic diagram of an example system for pre-initiating initialization steps, including at least one server device capable of forwarding prediction recommendations to a client device.

As in the examples of FIGS. 4A and 4B, user or browser histories, profiles, cookies, metadata, and other information can be used to increase the accuracy of predictions made relating to a user's likely requests to retrieve data. User histories can be compiled relating to any user interactions with the interface 340 or remote content accessed through the computing device 305. Indeed, in some instances, user histories and preference data can be aggregated for several users and computing devices on the network. As shown in FIG. 5A, an example system 500 can include a plurality of user computing devices 505, 510, 515 connected to a network 520 to access various data server computer 525, 530, 535.

In one instance, a server computer 525, such as a web server, can collect data related to requests for data from the server made by users 505, 510, 515. In one example, server 525 is a search engine. As shown in the signal diagram 540 of FIG. 5B, a visitor to the search engine site 525 may submit search queries 545 to the server 525, the server 525 responding with a listing of hyperlinked search results 550. A user can interact with hyperlinked search results displayed on the user's interface to submit additional requests for data, for example by clicking one of the hyperlinks. Using the aggregate user histories compiled by the server 525, the search engine server 525, in some instances, can predict 555 with relatively high certainty future user requests based on previous users' interactions with the site. For example, a user may submit a search query 545 to the search engine 525 for "Chicago cubs". Upon receiving the request for search result data relating to the query "Chicago cubs", the server 525 can consult a user history database 540 and determine 555 that, based on previous user queries and search results similar to "Chicago cubs", that the present user is likely to select a hyperlinked search result directing the user to the website of the Chicago Cubs professional baseball team. Accordingly, the server 525 can send its predicted user request as a hint 560 to the user's computer along with the search result data 550, recommending that the user computer 505 initiate initialization steps 565 relating to computing devices 530 hosting the Chicago Cubs website, thereby reducing latency for the likely, eventual request 570. In such an instance, a user computer can initiate initialization steps 565 for the Chicago Cubs website request prior to even displaying search results to the user relating to the "Chicago cubs" query. Such an arrangement can also be used in connection with a search engine toolbar on the user computer's browser, such as toolbar 375 in FIG. 3.

Figure 5B:
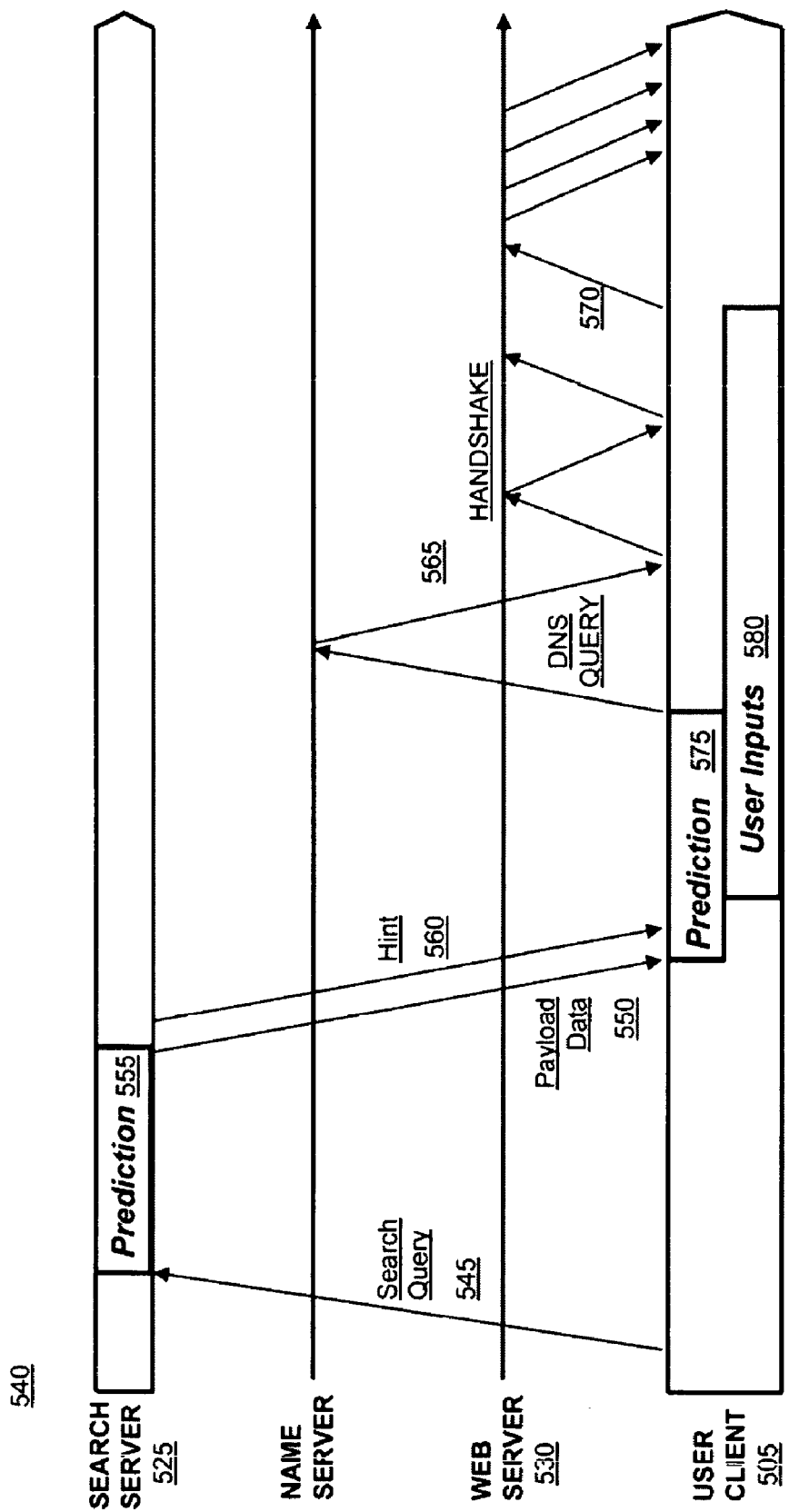
FIG. 5B is a signaling diagram of an example data transaction including the forwarding of a prediction recommendation to a client device.

As detailed above in connection with FIG. 5B, remote computing devices can predict future user requests for data based on data and information compiled by the remote computing devices, and send these predictions 555 as recommendations or hints 560 to user computers 505, 510, 515 likely to submit these future user requests 570. A user computer can determine whether or not to act on a prediction recommendation 560 transmitted from a third party computer. Indeed, a user computer can consider 575 a received prediction recommendation 560 together with other data, including detected user interactions 580, to make and act on a predicted user request. In some instances, a third-party computer may only make prediction recommendations upon detecting a user computer using a browser or other application adapted to pre-initiate initialization steps in response to predicted user requests for data. Further, user computers may only respond and act upon prediction recommendations or hints made by trusted third parties, in order to avoid initiating frivolous initialization sequences and transmissions based on the received hints.

Figure 6A:
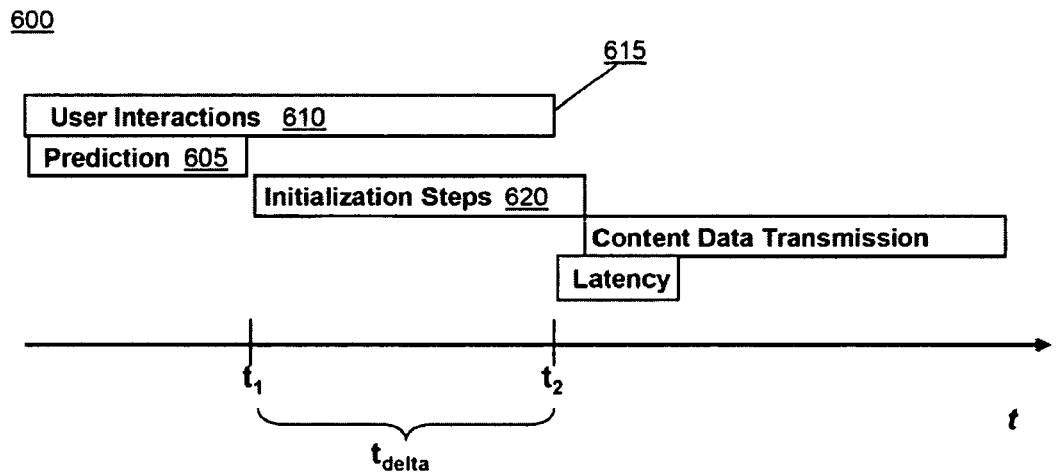
FIG. 6A is a signaling diagram of a first data transaction employing a prediction step used to pre-initiate initialization steps in the transaction.
Figure 6B:
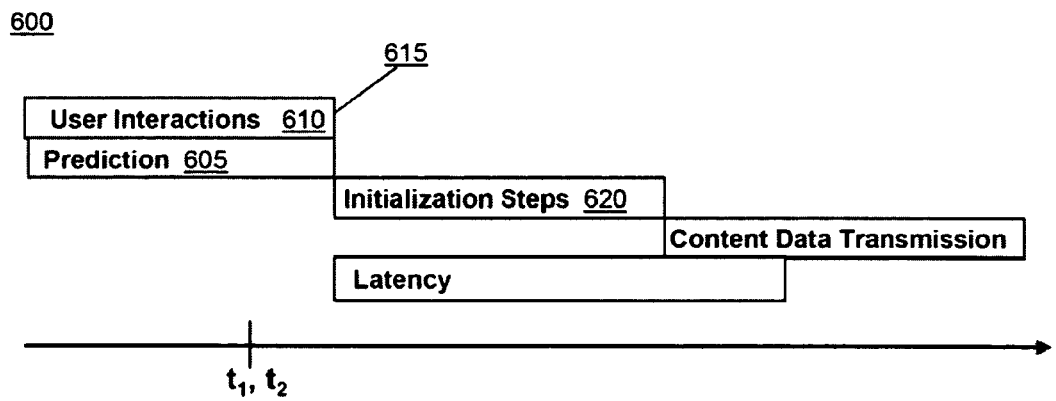
FIG. 6B is a signaling diagram of a second data transaction employing a prediction step used in the transaction.

In some instances, a prediction of a user request for data is only useful when the prediction can be made and acted upon before the actual request for data is submitted. As shown in the signaling diagram of FIG. 6A, a prediction is made 605 by a computing device, in time $t_1$, of one or more user requests for data prior to the user finalizing interactions 610 leading to the actual submittal 615 of the request for data at $t_2$. This allows certain initialization steps 620, such as a domain name resolution request, to be initiated prior to the submittal of the request for data 615, thereby decreasing perceived communication latency by $t_{delta}$. In some instances, depending on the prediction algorithm employed, a prediction 605 of sufficient reliability cannot be returned prior to the submittal of a user request 615, as illustrated in FIG. 6B. In such an instance, initialization steps 620 are performed as if no prediction had been performed and no decrease in latency results, despite the user computer's effort to preemptively predict a user request for data. Indeed, in some instances, the processing of a prediction can be terminated automatically once the user request is completed and submitted 615, for example, to preserve processing capacity.

While pre-initiating initialization steps in response to a predicted user request for data can decrease the communications latency perceived by a user, incorrect and frivolous initialization steps can, in many instances, burden the user computer's and the network's bandwidth and processing capacity. However, where bandwidth and processing capacity are plentiful, there may be instances where pre-initiated initialization steps can be triggered by less accurate predictions and/or for predictions involving multiple potential user requests. For example, a browser, in a response to a user interaction resulting in the opening of a new webpage, may identify a plurality of hyperlinks to other domains on the webpage. The user computer can initiate initialization steps for each, or a subset, of the hyperlinked domains in preparation for a predicted selection, by the user, of one of the hyperlinks. In some instances, hyperlinks can be identified, evaluated, and initialization steps for the hyperlinks initiated before the content containing the hyperlinks is even displayed to the user, allowing for substantial latency decreases in the event one of these hyperlinks is selected.

Figure 7:
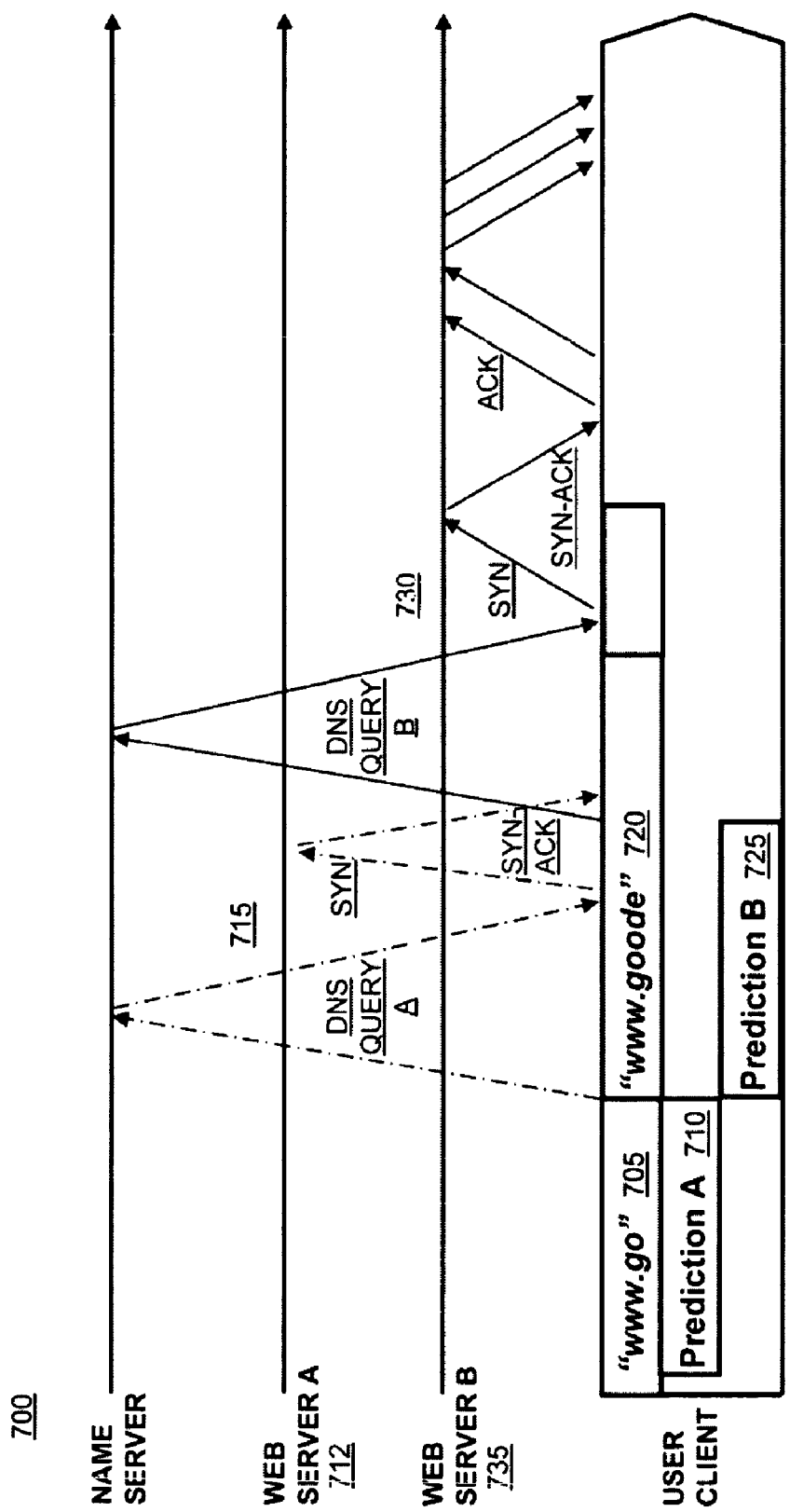
FIG. 7 is a signaling diagram of a data transaction employing a revised prediction step to pre-initiate initialization steps for more than one predicted request for data.

In another example, shown in the signaling diagram 700 of FIG. 7, multiple predictions can be made based on the progressive interaction 705 of a user with the browser interface. For instance, referencing the example of the FIG. 4A, a user, in an initial interaction 705, may enter the characters "www.am" in an address field of the browser, resulting in a first prediction 710 that the user intends to retrieve data from one or more servers 712 associated with www.amazon.com. In response to this prediction, initialization steps may be initiated 715 to prepare the user computer to send and receive data to and from the Amazon server. However, as the user continues to interact 720 with the browser, in this case entering additional characters specifying a URL beginning "www.amamo", the user computer may determine that the original prediction was incorrect and/or re-predict the outcome of the developing user request for data. In this example, the user computer can determine, based on the new inputs 720, that the user actually intends to request data from www.amamotocross.com, and issue a second prediction 725. The user computer can then initiate additional initialization steps 730 directed to preparing for communication with a server 735 associated with www. amamotocross.com. Additionally, the computer can terminate the initialization steps 715 initiated for communication with Amazon, or in other instances, complete the Amazon initialization steps 715, in the event that the user made an error in entering "www. amamo" and still intends to submit a request for data from Amazon. In other words, a user computer, or even a third party server making prediction recommendations, can make predictions, based on user interactions in a progressive fashion, dynamically reissuing or changing predictions and pre-initiated initialization steps as additional user interactions are received and detected.

Figure 8:
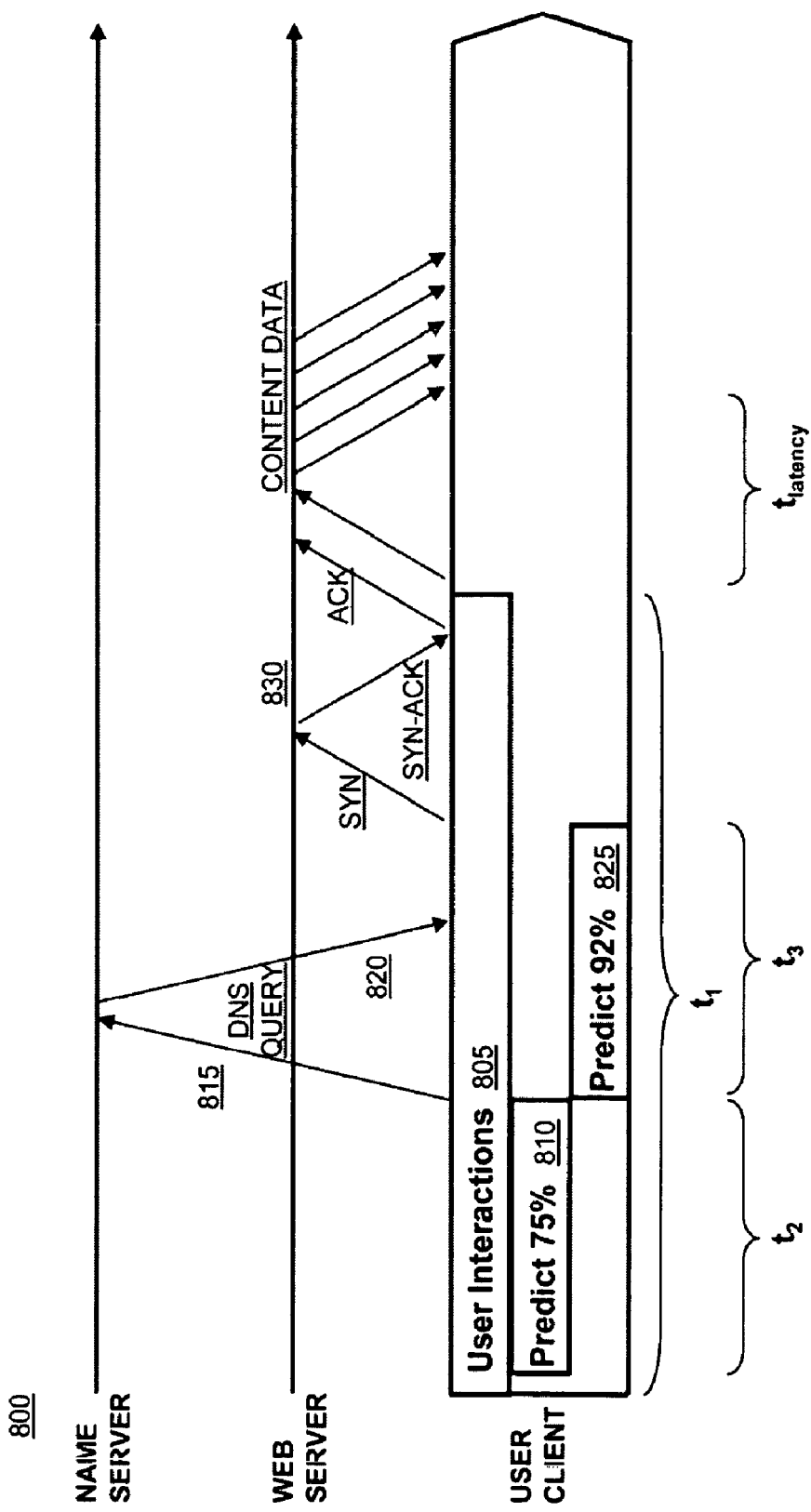
FIG. 8 is a signaling diagram of a data transaction employing a prediction algorithm bifurcating the pre-initiation of separate initialization steps in the transaction.

In many instances, the probability that a prediction will be accurate increases with the amount of user inputs (e.g., alphanumeric characters) detected and received, indicating the true intentions of the user regarding future submittals of data retrieval requests. In some instances, a user computer can exploit this generality by progressively initiating separate initialization steps as the probable accuracy of a request prediction increases. For example, where a user is attempting to request webpage data from a server on the internet, the user's eventual request for data can be predicted from the user's interactions with the browser interface. As shown in the signaling diagram 800 of FIG. 8, user interactions 805 are entered and detected during $t_1$. As user inputs and interactions are detected, the browser (or in some instances a third party server) can predict 810 with a first certainty threshold (e.g., 75% certainty) that a user will request data from a domain name www.example.com after time $t_2$. Here, the browser is permitted to initiate domain name resolution when a prediction meets or exceeds 75% certainty and, as a result of the predicted certainty threshold, sends a DNS request 815 to name servers to initiate resolution of the domain name into an IP address. At $t_3$, the domain name has been resolved 820. During this period, the user continues to provide inputs 805 evidencing the user's intention to request data from www.example.com. As additional user inputs are received during $t_3$, the user computer continues to make and update predictions 825 related to the user interaction. In this example, the computer determines, based on the additional user inputs, that the likelihood of the user requesting data from www.example. com has increased to 92%. Further, the algorithm applied by the user computer may dictate that a TCP handshake 830, or additional initialization steps following resolution of the domain name 820, may not proceed unless the certainty of the predicted request, upon which the initiation is based, exceeds a 90% threshold, as it does in this example. Setting a plurality of progressively demanding thresholds allows for the computer to begin initiating some initialization steps earlier, based on request predictions meeting lower accuracy thresholds. Additionally, multiple certainty thresholds can help conserve system and network resources by only committing to pre-initiate multiple or all initialization steps when higher degrees of prediction accuracy are assured.

Further, in some instances, where multiple initialization steps can be pre-initiated, each available initialization step can be assigned its own required certainty threshold. Accordingly, an initialization step is initiated or triggered only when the probable accuracy of a predicted request exceeds the initialization step's assigned certainty threshold. Such an algorithm can assist in making more efficient use of system and network resources by requiring that those initialization steps requiring the most bandwidth or system processing capacity, be assigned higher certainty thresholds so that more demanding initialization steps are only pre-initiated when the initiating computer is most certain that a predicted request is accurate. This can be particularly advantageous where there are multiple initialization steps that are sequence independent and can be initiated in any order.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer-readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer-readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
  detecting a user-initiated interaction with a user interface, the user-initiated interaction including entry of one or more alphanumeric characters;
  automatically predicting, based at least in part on the one or more alphanumeric characters, a user-generated request to retrieve data, wherein predicting the user generated request to retrieve data includes:
    identifying a first probability, associated with one or more domains in a first set of domains, that the user-initiated interaction represents a request for the one or more domains;
    determining that the first probability exceeds a first probability threshold;

selecting one or more domain names associated with the one or more domains in response to determining that the first probability exceeds a first probability threshold;

initiating a first network communication initialization step, wherein the first network communication initialization step includes resolution of the one or more domain names, based on the predicted user-generated request to retrieve data, into one or more network addresses prior to receiving a user-initiated submission of the user-generated request to retrieve data;

receiving continued user-initiated interaction with the user interface, the continued user interaction including two or more alphanumeric characters;

identifying a second probability, associated with one or more domains in a second set of domains, that the user generated request to retrieve data, including the continued user-initiated interaction represents a request for the one or more domains in the second set of domains;

determining that the second probability exceeds a second probability threshold, wherein the second probability threshold is higher than the first probability threshold; and initiating a second network communication initialization step in response to determining that the second probability exceeds a second probability threshold, wherein the second network communication initialization step is different from the first network communication initialization step.

2. The method of claim 1, wherein the user-initiated interaction is a partial text entry in a field of a web browser.

3. The method of claim 2, wherein the partial text entry is entered into an address field of the web browser.

4. The method of claim 1, wherein the user-initiated interaction is a user command to display a first webpage comprising at least one hyperlink and the predicted user-generated request to retrieve data is related to the at least one hyperlink.

5. The method of claim 4, wherein the user command is a query directed to a search engine and the first webpage displays search results generated by the search engine in response to the query.

6. The method of claim 1, further comprising initiating a network communication synchronization sequence with a data server associated with the predicted user-generated request to retrieve data, prior to receiving a user-initiated submission of the user-generated request to retrieve data.

7. The method of claim 6 wherein the initiation of the network communication synchronization sequence follows resolution of the one or more domain names and the one or more network addresses is associated with the data server.

8. The method of claim 1, wherein resolving the one or more domain names comprises:

sending at least one domain resolution request to a remote server capable of resolving domain names into their respective IP addresses; and receiving a response to the at least one domain resolution request identifying an IP address for at least one of the one or more domain names prior to receiving the user-initiated submission of the user-generated request to retrieve data.

9. The method of claim 1, wherein the user-initiated interaction is at least one of a text entry in a field of a search engine toolbar or an activation of a search engine toolbar.

10. The method of claim 1, wherein automatic prediction of a user-generated request to retrieve data is based at least in part on at least one of a stored user browsing history, stored user preference, stored cookie, or user profile data.

11. The method of claim 1 further comprising identifying a website based on the predicted user-generated request to retrieve data; and wherein initiating resolution of the one or more domain names includes initiating resolution of a domain name for the website into a network address for the website prior to receiving the user-initiated submission of the user-generated request to retrieve data.

12. A computer-implemented method comprising:

detecting a user-initiated interaction with a user interface;

automatically predicting, based at least in part on the user-initiated interaction, a user-generated request to retrieve data, wherein predicting the user-generated request to retrieve data includes:

identifying a first probability, associated with one or more domains in a first set of domains, that the user-initiated interaction represents a request for the one or more domains;

determining that the first probability exceeds a first probability threshold;

selecting one or more domain names associated with the one or more domains in response to determining that the first probability exceeds a first probability threshold;

initiating a first network communication initialization step, wherein the first network communication initialization step includes identifying a website based on the predicted user-generated request to retrieve data;

receiving continued user-initiated interaction with the user interface, the continued user interaction including two or more alphanumeric characters;

identifying a second probability, associated with one or more domains in a second set of domains, that the user generated request to retrieve data, including the continued user-initiated interaction represents a request for the one or more domains in the second set of domains;

determining that the second probability exceeds a second probability threshold, wherein the second probability threshold is higher than the first probability threshold; and initiating a second network communication initialization step in response to determining that the second probability exceeds a second probability threshold, wherein the second network communication initialization step includes a network communication synchronization sequence with the website associated with the predicted user-generated request to retrieve data, prior to receiving a user-initiated submission of the user-generated request to retrieve data.

13. The method of claim 12, wherein the automatic prediction of a user-generated request to retrieve data is made by a first computer and transmitted to a second computer responsible for initiating the network communication synchronization sequence.

14. The method of claim 13, wherein the automatic prediction is based in part on historical data compiled from a plurality of users having accessed the first computer.

15. The method of claim 12, wherein the user-initiated interaction is at least one of a text entry in a field of a search engine toolbar or an activation of a search engine toolbar.

16. The method of claim 12, wherein the network communication synchronization sequence is a three-way handshake.

17. The method of claim 12, wherein a plurality of user-generated requests to retrieve data are automatically predicted and network communication synchronization sequences are initiated with a plurality of data servers.

18. A system comprising:
a plurality of remote data servers capable of being accessed by client computing devices over a network;
a first client computing device comprising a user interface and adapted to:
    detect a user-initiated interaction with the user interface, the user-initiated interaction including entry of one or more alphanumeric characters;
    receive user-initiated submissions of requests to retrieve data from at least one of the plurality of remote data servers;
    automatically predict, based at least in part on the one or more alphanumeric characters, a user-generated request to retrieve data, wherein predicting the user-generated request to retrieve data includes:
        identifying a first probability, associated with one or more domains in a first set of domains, that the user-initiated interaction represents a request for the one or more domains;
        determining that the first probability exceeds a first probability threshold;
        selecting one or more domain names associated with the one or more domains in response to determining that the first probability exceeds a first probability threshold;
    initiate a first network communication initialization step, wherein the first network communication initialization step includes resolution of the one or more domain names, based on the predicted user-generated request to retrieve data, into one or more network addresses prior to receiving a user-initiated submission of the user-generated request to retrieve data;
    receive continued user-initiated interaction with the user interface;
    determine that the continued user-initiated interaction changes the predicted user-generated request to retrieve data, the continued user interaction including two or more alphanumeric characters;
    identifying a second probability, associated with one or more domains in a second set of domains, that the user generated request to retrieve data, including the continued user-initiated interaction represents a request for the one or more domains in the second set of domains;
    determining that the second probability exceeds a second probability threshold, wherein the second probability threshold is higher than the first probability threshold; and
    initiating a second network communication initialization step in response to determining that the second probability exceeds a second probability threshold, wherein the second network communication initialization step is different from the first network communication initialization step; and
at least one remote domain name server capable of receiving requests from the client computing device related to resolutions of domain names.

19. The system of claim 18 further comprising at least one other client computing device;
    wherein a particular one of the plurality of remote data servers is adapted to:
        record a history of client computing device requests for data;
        automatically predict subsequent client computing device requests for data based at least in part on the history; and
        transmit recommendations to client computing devices relating to the automatically-predicted subsequent requests for data; and
    wherein the first client computing device is further adapted to automatically predict a user-generated request to retrieve data based at least in part on a received recommendation from the particular remote data server.

20. The system of claim 19, wherein the particular remote data server is a search engine server.

21. The system of claim 18, wherein the first client computing device is further adapted to initiate a network communication synchronization sequence with at least one of the plurality of remote data servers associated with the predicted user-generated request to retrieve data, prior to receiving the user-initiated submission of the user-generated request to retrieve data.

22. The system of claim 18, wherein the first client computing device is further adapted to store user profile data and automatically predict a user-generated request to retrieve data based at least in part on the stored user profile data.

23. The system of claim 18, wherein the first client computing device is further operable to identifying a website based on the predicted user-generated request to retrieve data; and wherein initiating resolution of the one or more domain names includes initiating resolution of a domain name for the website into a network address for the website prior to receiving the user-initiated submission of the user-generated request to retrieve data.

24. An article comprising a machine-readable, non-transitory storage medium storing instructions for causing computer processing apparatus to perform operations comprising:
    detecting a user-initiated interaction with a user interface, the user-initiated interaction including entry of one or more alphanumeric characters;
    automatically predicting, based at least in part on the one or more alphanumeric characters, a user-generated request to retrieve data, wherein predicting the user-generated request to retrieve data includes:
        identifying a first probability, associated with one or more domains in a first set of domains, that the user-initiated interaction represents a request for the one or more domains;
        determining that the first probability exceeds a first probability threshold;
        selecting one or more domain names associated with the one or more domains in response to determining that the first probability exceeds a first probability threshold;
    initiating a first network communication initialization step, wherein the first network communication initialization step includes resolution of the one or more domain names, based on the predicted user-generated request to retrieve data, into one or more network addresses prior to receiving a user-initiated submission of the user-generated request to retrieve data;
    receiving continued user-initiated interaction with the user interface, the continued user interaction including two or more alphanumeric characters;
    identifying a second probability, associated with one or more domains in a second set of domains, that the user generated request to retrieve data, including the continued user-initiated interaction represents a request for the one or more domains in the second set of domains;
    determining that the second probability exceeds a second probability threshold, wherein the second probability threshold is higher than the first probability threshold; and initiating a second network communication initialization step in response to determining that the second probability exceeds a second probability threshold, wherein the second network communication initialization step is different from the first network communication initialization step.

25. The article of claim 24, wherein the machine-readable storage medium stores further instructions for causing computer processing apparatus to perform operations comprising:
initiating a network communication synchronization sequence with a data server associated with the predicted user-generated request to retrieve data, prior to receiving a user-initiated submission of the user-initiated submission of the user-generated request to retrieve data.

26. The article of claim 24 further comprising identifying a website based on the predicted user-generated request to retrieve data; and wherein initiating resolution of the one or more domain names includes initiating resolution of a domain name for the website into a network address for the website prior to receiving the user-initiated submission of the user-generated request to retrieve data.

* * * * *

UNITED STATES PATENT AND TRADEMARK OFFICE
CERTIFICATE OF CORRECTION

| | | |
|---|---|---|
| PATENT NO. | : 8,260,938 B2 | Page 1 of 1 |
| APPLICATION NO. | : 12/359038 | |
| DATED | : September 4, 2012 | |
| INVENTOR(S) | : Apurv Gupta | |

It is certified that error appears in the above-identified patent and that said Letters Patent is hereby corrected as shown below:

In column 22, lines 1-2, after "the" delete "user-initiated submission of the".

Signed and Sealed this
Twenty-seventh Day of November, 2012

David J. Kappos
*Director of the United States Patent and Trademark Office*